(12) United States Patent
Ward

(10) Patent No.: US 6,456,067 B1
(45) Date of Patent: Sep. 24, 2002

(54) INDUCTIVE PRODUCT SENSOR FOR A REFRESHMENT CENTER

(75) Inventor: Ronald C. Ward, Salt Lake City, UT (US)

(73) Assignee: eRoomSystem Technologies, Inc., Las Vegas, NV (US)

( * ) Notice: Subject to any disclaimer, the term of this patent is extended or adjusted under 35 U.S.C. 154(b) by 75 days.

(21) Appl. No.: 09/587,449

(22) Filed: Jun. 5, 2000

(51) Int. Cl.[7] .......................... G01R 33/12; G01R 33/00

(52) U.S. Cl. ..................... 324/236; 324/226; 324/262

(58) Field of Search ........................... 324/236, 207.11, 324/207.22, 207.16, 207.26, 226, 262; 221/2, 6, 17

(56) References Cited

U.S. PATENT DOCUMENTS 3,397,364 A  *  8/1968  Crandall ..................... 324/236

* cited by examiner

Primary Examiner—Walter E. Snow
(74) Attorney, Agent, or Firm—Thorpe North & Western, LLP

(57) ABSTRACT

A product sensor system for use in a refreshment center configured to sense a number of metal product containers. The sensor device can comprise a support shelf mounted in the refreshment center, which holds the product containers. One or more sensor loops are arranged on the shelf below the product containers, and an analysis circuit is connected to the sensor loops to measure the changes in inductance at the sensor loop when product containers are removed from the refreshment center. A microprocessor compares the signals from the inductance sensing circuit with values stored in memory to determine the amount of product remaining.

25 Claims, 4 Drawing Sheets

INDUCTIVE PRODUCT SENSOR FOR A REFRESHMENT CENTER

TECHNICAL FIELD

This invention relates generally to the field of vending machines, and more particularly to an inductive product sensor in an open-access vending machine.

BACKGROUND ART

Hotels offer many services for customers staying in their rooms. One service a hotel customer may find in their room is an "open-access refreshment center" or "refreshment bar" that is pre-stocked with drinks and snacks by the hotel. The hotel charges a per item fee for each refreshment product that is used-by the customer. If the number of refreshment units consumed by the customer is inaccurate or incorrectly counted, then the hotel and the customer will be faced with inappropriate charges to resolve. If there is an undercount, the hotel will lose money. If an overcount occurs, the customer will be overcharged by the refreshment center. Accordingly, it is important for a hotel to be able to track the number of refreshment units a hotel customer has used so the guest is charged correctly.

In contrast to the desire to be able to properly track the number of items used by the customer, there are other features that are desired in a refreshment bar. It is important for customers to have free unobstructed access to the product (e.g., cans). Users are more likely to consume the products if they can just reach into a refrigerator or dispenser unit and take the product without moving a mechanical arm or similar counter mechanism. The accessibility of the product is also enhanced when the product stands upright with the product label facing forward, as opposed to rolling the product container on its side. Also, when a user can view the label, the user is more likely to remove and purchase the item.

It is important, from a manufacturing point of view, to be able to use an inexpensive sensor to count the number of items used. In addition, an inventory system which provides accurate real-time inventory for a refreshment center is very valuable. A real-time reporting system with centralized data collection can alleviate the need to have a stocking person perform inventory control tasks.

Additionally, being able to do electronic inventory control tasks allows a hotel to restock the refreshment centers only when necessary. The hotel know what products need to be restocked based an electronically determined inventory status, and can order only those products needed. This relieves the need for additional product storage at a location other than the vending machines themselves.

Refreshment centers typically comprise a refrigerator, or a dispensing housing including internal shelves to store one or more products for sale. The refreshments stocked may be, for example, canned drinks, bottled drinks, packaged snacks or foods, and similar items. Conventionally, some vending machines have one or more angled shelves configured to dispense cans. The angled shelves facilitate rolling or sliding the remaining product forward when the first one is removed. A switch at the end of the row senses when a guest or customer removes a product. Then a tally is kept of how many items were used by the guest.

Vending machines exist with free-standing product items but they require a switch or optical sensor at each product location. Although it is logical to have a switch at each product location, it can also be costly, particularly if there are many items to be dispensed in the refreshment center. For example, one device uses visible light switches or infra-red switches placed at each product location. Another technique uses capacitance sensors at each product location. This technology is not low cost because there must be many sensors per row. Furthermore, capacitive sensing is sometimes affected by nearby objects such as the refrigerator door or a person's hand. This can cause problems as to whether the number of product items is counted correctly or not.

SUMMARY OF THE INVENTION

It has been recognized that it would be advantageous to develop a product sensor system for inductively sensing products in a vending machine. Additionally, it would be valuable to provide a cost effective sensor which is not interfered with by nearby objects. It is also important to have a sensor system which allows the product items to be free-standing and easily accessible.

The product sensor system includes a support shelf mounted in the refreshment center, which holds the product containers. Sensor loops are arranged on the shelf adjacent to the product containers, and an analysis circuit is connected to an inductance circuit and sensor loops to measure the inductance changes when product containers are removed from the refreshment center. In one embodiment, a signal from the analysis circuit is compared against a signal from a reference oscillation circuit. The magnitude of a measured phase shift between these two signals indicates the number of product cans placed on the sensor loops. These and other features, advantages, and alternative aspects of the present invention will become apparent to those skilled in the art from a consideration of the following detailed description, taken in combination with the accompanying drawings.

DETAILED DESCRIPTION

Reference will now be made to the drawings in which the various elements of the present invention will be given numerical designations and in which reference to the invention will be discussed. It is to be understood that the following description is only exemplary of embodiments of the present invention, and should not be viewed as narrowing the claims which follow.

Figure 1:
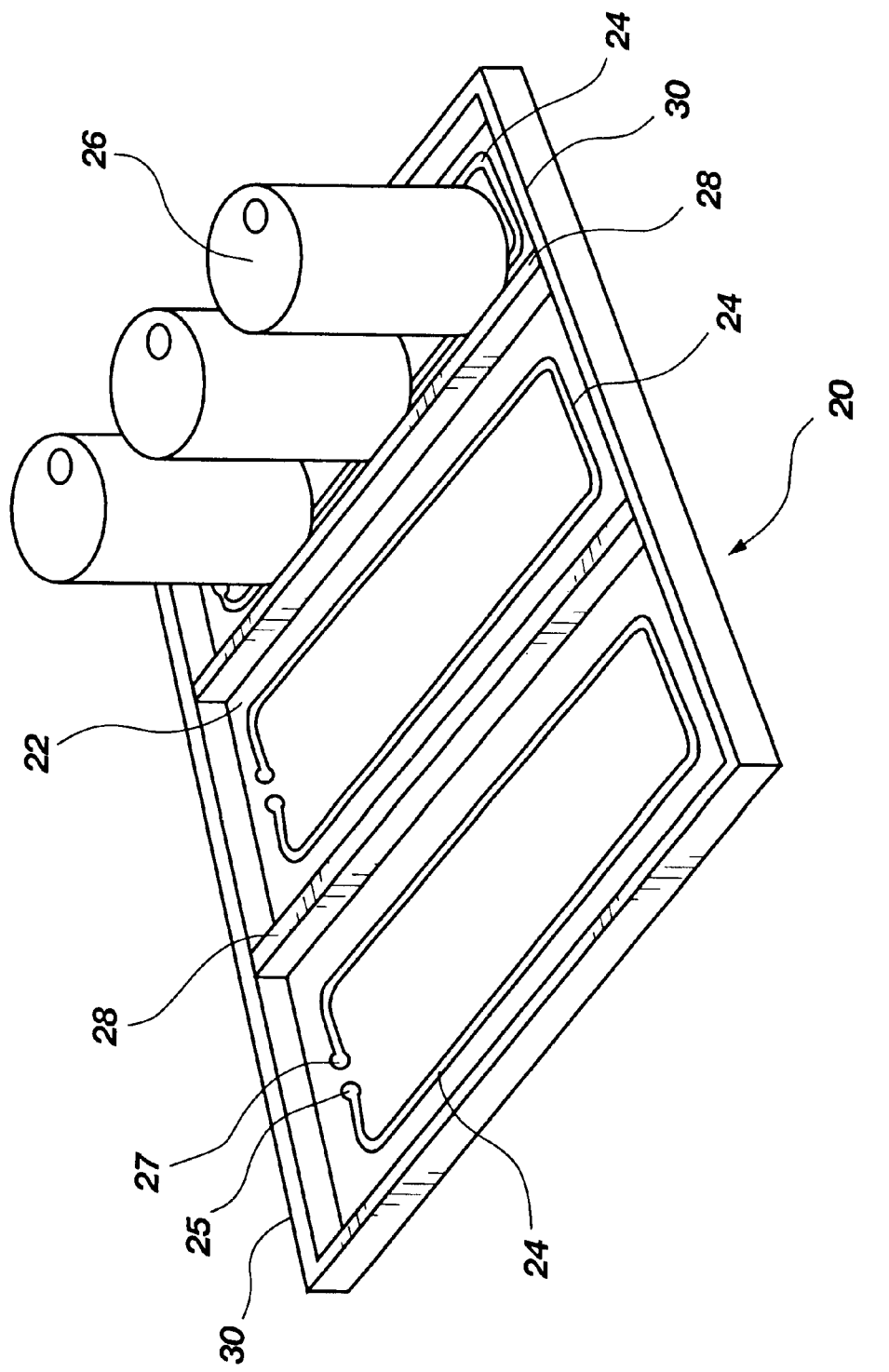
FIG. 1 is a perspective view of a shelf, configured to be located in a refreshment center, with sensing loops under a row of product containers.

With reference to FIG. 1, a product sensor system 20 includes a support shelf 22 for products such as cans 26. The support shelf comprises a printed circuit board, but it can also be plastic, wood, composite, or a laminate type of material. A sensor loop 24 or an inductive coil is attached on the support shelf under a row of product cans. Mounting the sensor loop 24 (or loops) may be done by using fasteners, gluing, or adhering the loop to the support shelf 22. The sensor loop may also be embedded into the support shelf if it is made of plastic or some other composite material. Alternatively, the sensor loop can be etched as a trace directly onto a printed circuit board and covered with a protective plastic coating.

The product cans 26 are divided into rows by row dividers 28. The row dividers help keep the product cans in the rows or channels and also align the product cans over the sensor loop 24. Surrounding the support shelf 22 is a stiffening flange 30 which also serves as a stop for the product cans. The stiffening flange adds rigidity to the support shelf and also stops the product cans from sliding off the support shelf when it is set at an angle. If the shelf is not angled, a stiffening flange is not needed. It is also possible for the product cans to be set on their side and configured to roll forward, although it is less pleasing to customers.

The product cans 26 will most likely contain beverages. However, they could also contain other sundry items such as snack food or toiletries.

Referring again to FIG. 1, the refreshment center provides unobstructed access to the product cans 26 which means a customer will be more likely to purchase (i.e., remove) the cans. Simple access also allows the customer to easily remove, inspect, and replace the product without being charged. The refreshment center can be provided with an electronic circuit which clocks the length of time a product has been removed from the shelf 20. If the product has been removed for more than a set amount of time (e.g., 15–60 seconds) then the customer will be charged for the product.

As mentioned, inductive sensing is used to determine the number of products which are in a specific row. Persons skilled in the art of basic electronics will understand the interaction of the products cans 26 with the inductive sensor loop 24 and the way in which an inductive sensor loop generates surrounding magnetic lines of force when an electrical current flows through the sensor loop. Inductive sensing has a much higher percentage of signal change than capacitive sensing techniques. Thus, there is less error in detecting whether products have been removed or not. The size of the inductive loops can be adjusted to affect the sensing range. A narrow loop will sense only close metal objects while a larger or wider loop will sense objects farther away. Another benefit is that inductive sensing is not affected by outside interference like the proximity of other objects such as adjacent products, the refrigerator door, a person's hand, etc. In contrast, capacitive sensing is affected by nearby and outside objects such as adjacent products or the refrigerator door. This is because in a capacitive sensing rack the whole can or product is charged and discharged making it more susceptible to proximity effects and touching by a hand.

It is also advantageous to have a sensor system which does not sense non-metallic objects. Inductance sensing is not affected by non-metallic objects. The sensor loops 24 of this invention are affected by metallic objects (cans and other metal objects) which affect the magnetic lines that build up and collapse surrounding an inductance sensor loop. Those skilled in the art of electronics will understand the effect of metallic objects on inductance in the sensor loop.

Consequently, the metal objects affect the phase of the signal in the circuit. For example, if the customer attempts to put a glass bottle product back in the wrong place (i.e. on the inductive sensor), the inductive sensor does not register it. When someone puts a glass bottle on an inductive sensor after removing it from a-different row, they are not credited for returning it. This motivates the customer to return the glass bottle to the correct row, because each product must be returned to the location from where it was removed for the customer to receive a credit. Each product is labeled and priced. So if an item is returned to the wrong spot, the processor does not display a credit for the labeled price. When the customer replaces the can over the inductive sensor, then the processor displays a credit for returning the can (if it is returned within a certain amount of time).

Since the product sensor system 20 senses metallic objects, but not other (non-conductive) materials, metal cans 26 can be used with the inductive sensor. If non-metallic objects, such as plastic or glass containers, are used with the inductive sensor, then a metal strip can be adhered to them to enable the inductive sensor to detect the removal of the non-metallic objects.

The inductive sensing system 20 in the present invention lets real-time inventory be performed. In one embodiment, product cans 26 removed by a customer are inductively detected and recorded by a microprocessor (not shown) in the refreshment center. This information is relayed to a central computer or server in a networked system. A hotel then always knows what its inventory is in each refreshment center. As a result, inventory does not need to be recorded or taken by a restocking person. The hotel automatically knows how much has been sold, and a product replacement order can also be placed based on the amount of product sold.

A significant advantage of this device is the use of one sensor to detect a row of multiple items and it does not require one sensor for each product item to be dispensed. Using an individual sensor for each vending item increases the cost of the refreshment center. It should be recognized that one skilled in the art can configure the product sensor system to use one sensor loop per product item.

As described, the cans 26 are sensed inductively by one or more sensor loops 24 located under each row of cans. The inductance of the sensor loops as altered by the metal objects on top of them can be measured by well known inductance circuit measuring techniques. In other words, there are many known circuits which can measure the inductance of a circuit connected to a sensor loop. One measuring circuit will be described in detail below. One skilled in the art would be able to build and use a circuit which measures inductance in sensor loops as listed below, such as:

A. Making the sensor loop part of a LC (inductance capacitance) resonant oscillator circuit and measuring the frequency or the period of oscillation to find the number of product containers present.

B. Using a LR (inductance resistance) circuit and measuring the frequency or oscillation to determine the number of product containers present.

C. Making the inductance loop 24 part of a voltage controlled oscillator in a phase locked loop and using the oscillator control voltage magnitude to indicate the change in inductance.

D. Measuring the amount of time for the current in the circuit to rise to a given threshold after applying a voltage step to the circuit.

E. Measuring the amount of time for the voltage to decay to a given threshold after applying a short current step to the circuit.

F. Applying an AC signal to a LC or LR circuit incorporating the inductance sensor loop 24 and measuring the resulting phase shift to determine the inductance.

G. Using a resonance, Owen, Maxwell, Hay or other AC bridge circuit to measure the inductance.

These circuits listed can be implemented by one skilled in the art without undue experimentation since they are Each based on well known basic electronic circuits.

Figure 2:
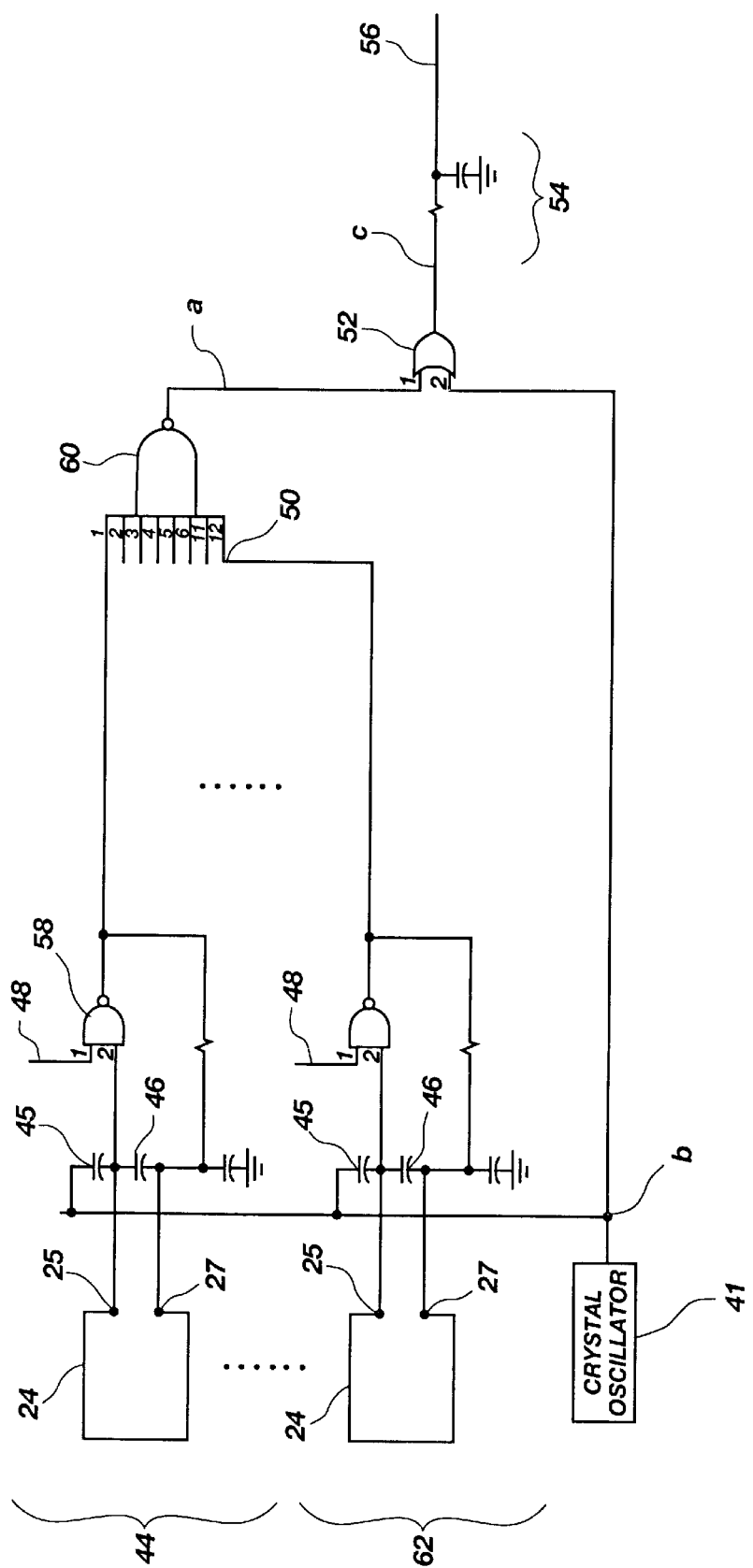
FIG. 2 is a schematic diagram of a circuit for sensing inductance which can be used with the sensing loops shown in FIG. 1.

FIG. 2 illustrates a schematic diagram of a circuit for sensing inductance which can be used with the shelf 20 shown in FIG. 1. Referring now to FIG. 2, the circuit is a low-cost circuit for sensing inductance changes by converting phase changes in a LC sensor resonant sensor loop circuit to a variable duty cycle pulse waveform. This waveform is then low-pass filtered to get a DC signal proportional to the number of product containers in each row in the shelf.

More specifically, the sensor loop 24 is located below a row of cans 26 or there may be several sensor loops for each row. Referring to FIGS. 1 and 2, the sensor loop 24 is connected to the can sensing circuit 44 at connections 25 and 27. An oscillator 41 is used as a constant reference signal and in the illustrated embodiment a crystal oscillator is used to generate the reference signal. It will be understood by those skilled in the art that a number of different well-known oscillation circuits can be used to generate a reference oscillation signal. The oscillator output is capacitively coupled to the sensor loop 24 by means of capacitor 45. Capacitor 46 resonates with the inductance of the sensing loop. Coupling capacitor 45 induces an oscillation signal into the sensor loop circuit that is nominally 90 degrees advanced in phase, relative to the reference signal. Each metal can or container added over the sensor loop advances the phase of the induced oscillation cycle. The sensing circuit is tuned to resonance when the row is about half full of cans by means of capacitor 46. This circuit tuning produces the largest output amplitude and fastest phase change as cans are added. When no cans are on the sensing loop, the XOR gate output 52 will be a 1 most of the time because both signals input to the XOR gate will be nearly opposite phases. On the other hand, when cans are placed over the sensing loop then the phase of the sensing loop signal advances in phase. The more metal containers that are on the sensing loop, the smaller the inductance and the more the phase is advanced in the sensing loop circuit. At every point in time where the sensing loop signal and the reference signal are not the same (i.e. one is 0 and the other is 1) the XOR gate will generate 1. The more the signal phase advances, the longer time a logic 0 signal is present at the XOR gate output each clock cycle. Thus, an increasing number of product cans on the sensor loop generates logic 0s for a higher percentage of the time resulting in a lower average voltage output at 56.

Figure 3:
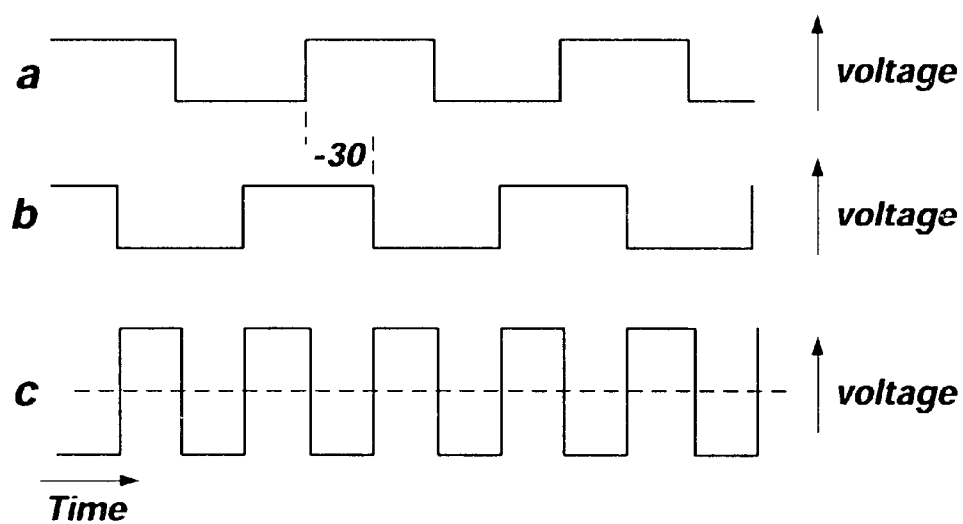
FIG. 3 is a time versus voltage graph of the signal states over time at certain points marked a, b, and c in FIG. 2 when a row of product containers is half full of cans.
Figure 4:
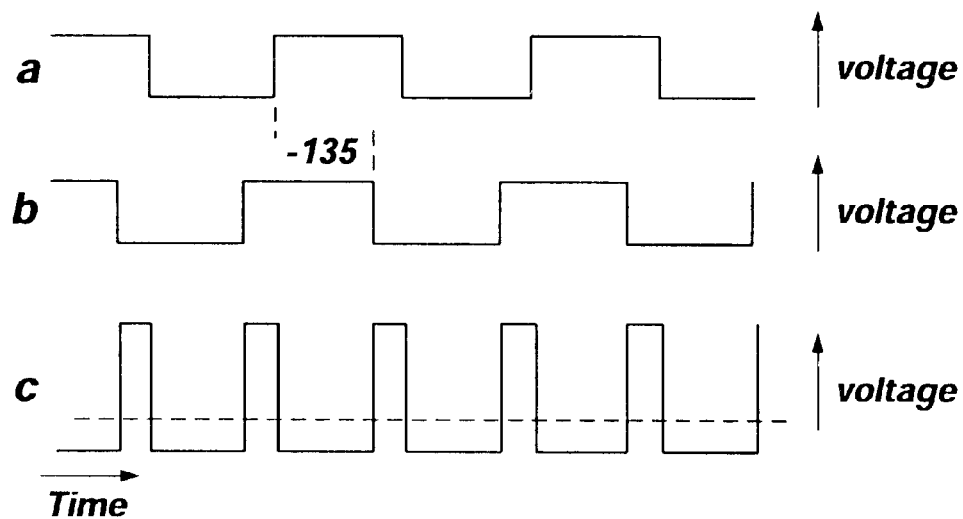
FIG. 4 is a time versus voltage graph at certain points marked a, b, and c in FIG. 2 when a row of product containers is full of cans.
Figure 5:
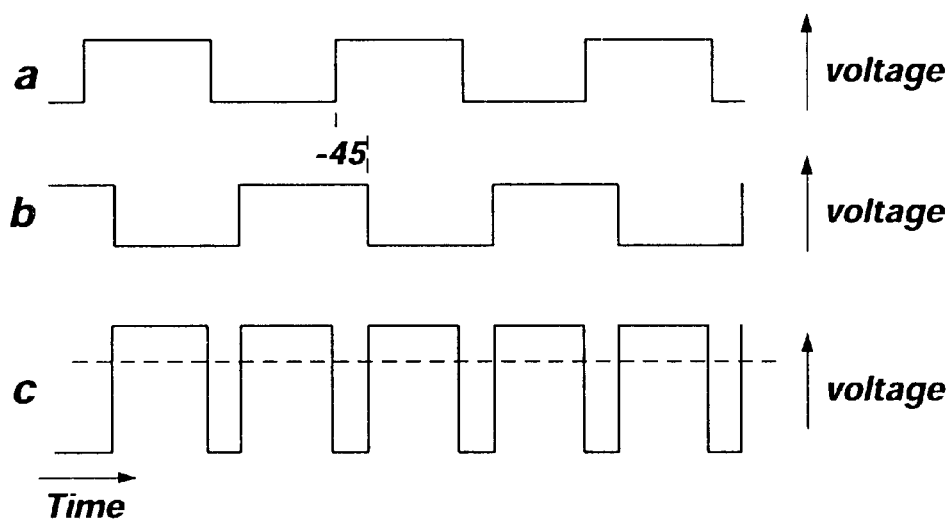
FIG. 5 is a time versus voltage graph at certain points marked a, b, and c in FIG. 2 when no product containers are in a row.

Referring now to FIG. 3, the reference signal is illustrated as line (b) which corresponds to point b in FIG. 2. The square wave as shown by line (a) is the phase-shifted signal as it leaves a second NAND gate 60 at point a. Finally, line (c) is the output of the XOR gate 52 based on the input of lines (a) and (b). The example shown in FIG. 3 illustrates where line (a) has phase shifted −90 degrees as compared to line (b) so the output is 50% duty cycle (c) which represents that the row is half full. Then when the row is completely full, it may have shifted to −135 degrees so that duty cycle is 25% which represents the row being full as depicted in FIG. 4. If the row is empty, as illustrated in FIG. 5, the phase shift will be −45 degrees and the duty cycle 75%. The RC filter 54 (FIG. 2) changes signal (c) into a DC voltage proportional to product consumption.

Referring again to FIG. 2, the LC circuit for the sensing loop is connected to a first NAND gate 58. Since there are many of these inductance sensing loops 62, there are also multiple sensing connections 50 to the second NAND gate 60. Whether or not signals are sent from a product row to the second NAND gate is determined by row sense enables 48 connected to the first NAND gates. Only one row at a time will be tested to see if the number of cans in that row has changed. Logic is incorporated into the circuit which cycles through the inductive sensors 44, 62 using a row enable 48. As mentioned, the output of the XOR gate 52 passes through a low pass filter 54 to provide a DC signal to an analog-to-digital converter or a metering circuit.

This analysis circuit as illustrated in FIG. 2 is only one way to implement the present invention. There are other circuits which can be used to measure the inductance and convert that to a digital representation of the number of product cans in a row.

It is to be understood that the above-described arrangements are only illustrative of the application of the principles of the invention. Numerous modifications and alternative arrangements may be devised by those skilled in the art without departing from the spirit and scope of the present invention.

What is claimed is:

1. A product sensor system for use in a refreshment center configured to sense product containers, comprising:
   (a) an inductive sensor loop, disposed in the refreshment center, and positioned adjacent the product containers configured to produce a sensor signal;
   (b) an analysis circuit, connected to the sensor loop, configured to measure a change in inductance of the sensor loop when a change in the number of product containers in the refreshment center occurs, wherein the number of product containers in the refreshment center can be tracked.

2. A product sensor device as in claim 1, further comprising a reference oscillation circuit which produces a reference signal to compare with the sensor signal produced by the sensor loop.

3. A product sensor device as in claim 1, wherein multiple product containers are sensed by a single inductive sensor loop.

4. A product sensor device as in claim 1, wherein a single product container is sensed by a single inductive sensor loop.

5. A product sensor system for use in a refreshment center configured to sense product containers, comprising:
   (a) an inductive sensor loop, positioned adjacent the product containers configured to produce a sensor signal;
   (b) an analysis circuit, connected to the sensor loop, configured to measure a change in inductance of the sensor loop when a change in the number of product containers in the refreshment center occurs, wherein the number of product containers in the refreshment center can be tracked; and
   (c) an angled shelf, adjacent the product containers, configured to support the inductive sensor loop and analysis circuit, and configured to allow the product containers to slide to an end of the angled shelf.

6. A product sensor device as in claim 1, further comprising an inductance oscillation circuit coupled to the sensor loop to measure phase shift of a sensor signal in the sensor loop.

7. A product sensor device as in claim 6, wherein the inductance oscillation circuit further comprises a resonance capacitance.

8. A product sensor system for use in a refreshment center configured to sense product containers, comprising:

(a) an inductive sensor loop, positioned adjacent the product containers configured to produce a sensor signal;

(b) an analysis circuit, connected to the sensor loop, configured to measure a change in inductance of the sensor loop when a change in the number of product containers in the refreshment center occurs, wherein the number of product containers in the refreshment center can be tracked;

(c) an inductance oscillation circuit coupled to the inductive sensor loop to measure phase shift of a sensor signal in the sensor loop; and the inductance oscillation circuit further comprises a row sense enable and a NAND gate.

9. A product sensor device as in claim 8, wherein the analysis circuit further comprises an XOR gate which outputs a duty cycle based on the phase differences between signals from the inductance circuit and reference oscillation circuit.

10. A product sensor device as in claim 9, wherein the analysis circuit further includes a low pass filter configured to output DC signals.

11. A product sensor device as in claim 1, further comprising an analog to digital converter which digitizes the output of the analysis circuit.

12. A product sensor system configured for use in a refreshment center to sense a quantity of product cans contained therein, comprising:

(a) a support shelf, mounted in the refreshment center, configured to hold a row of product cans;

(b) an inductance coil, supported by the shelf below row of product cans;

(c) an inductance circuit coupled to the inductance coil;

(d) an analysis circuit, connected to the inductance coil, to measure changes in the inductance when product cans are removed from the refreshment center.

13. A product sensor system configured as in claim 12, wherein the inductance circuit comprises an inductance capacitance oscillator circuit which measures a frequency of oscillation.

14. A product sensor device as in claim 12, wherein the inductance circuit comprises an inductance capacitance oscillator circuit which measures a period of oscillation.

15. A product sensor device as in claim 12, wherein the inductance circuit comprises an inductance resistance oscillator circuit which measures a frequency and a period of oscillation.

16. A product sensor device as in claim 12, wherein the inductance circuit measures an amount of time needed for the current to rise to a threshold value after applying a voltage step, which amount of time indicates the number of product cans located over the inductance coil.

17. A product sensor device as in claim 12, wherein the inductance circuit. measures an amount of time needed for the voltage to decay to a given threshold value after applying a current step, which amount of time indicates the number of product cans located over the inductance coil.

18. A product sensor device as in claim 12, wherein the inductance circuit comprises an AC bridge circuit.

19. A product sensor device as in claim 12, wherein the inductance circuit applies an AC signal and measures a resulting phase shift, which phase shift indicates the inductance and allows a number of product cans to be measured.

20. A product sensor device as in claim 12, wherein the inductance coil is part of a voltage controlled oscillator circuit in a phase locked loop circuit, wherein the magnitude of an oscillator control voltage indicates inductance and number of product cans in the row.

21. A method for sensing an amount of products in a refreshment center, comprising:

(a) providing a sensor loop adjacent the products;

(b) providing an inductive circuit electrically coupled to the sensor loops;

(c) inducing a voltage signal to the inductance circuit which is coupled to the sensor loop;

(d) analyzing a signal shift in the inductance circuit which occurs when a change in the number of products in the refreshment center occurs; and (e) determining the number of remaining products in the refreshment center after the change.

22. A method as described in claim 21, wherein the step of analyzing a signal shift further comprises the step of producing a reference oscillation signal which is compared with the signal produced by the inductance circuit.

23. A method as described in claim 22, wherein the step of analyzing a signal shift further comprises providing and using an XOR gate to produce a measurable duty cycle which correlates with a number of products adjacent the sensor loop.

24. A method as described in claim 21, wherein the signal shift is a phase shift.

25. A method as described in claim 21, wherein the signal shift is a frequency shift.

* * * * *